(12) United States Patent
Oyman et al.

(10) Patent No.: US 11,152,966 B1
(45) Date of Patent: Oct. 19, 2021

(54) DIGITAL ACTIVE INTERFERENCE CANCELLATION FOR FULL DUPLEX TRANSMIT-RECEIVE (TX-RX) CONCURRENCY

(71) Applicant: Amazon Technologies, Inc., Seattle, WA (US)

(72) Inventors: Basak Oyman, Mountain View, CA (US); Sai Prashanth Chinnapalli, Dublin, CA (US); Morris Yuanhsiang Hsu, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 16/566,598

(22) Filed: Sep. 10, 2019

(51) Int. Cl.
*H04B 1/00* (2006.01)
*H04B 1/10* (2006.01)
(Continued)

(52) U.S. Cl.
CPC ............... *H04B 1/10* (2013.01); *H04B 1/04* (2013.01); *H04B 1/1036* (2013.01); *H04B 1/16* (2013.01); *H04B 1/525* (2013.01); *H04B 1/7097* (2013.01); *H04B 1/715* (2013.01); *H04B 1/7107* (2013.01); *H04B 1/719* (2013.01); *H04B 15/00* (2013.01);
(Continued)

(58) Field of Classification Search
CPC ........ H04B 1/10; H04B 1/7107; H04B 1/719; H04B 15/00; H04B 1/7097; H04B 1/715; H04B 1/525; H04B 1/1036; H04B 1/16; H04B 1/04; H04B 1/126; H04B 1/62; H04J 11/004; H04L 5/1461; H04W 4/80; H04W 84/12
See application file for complete search history.

(56) References Cited

U.S. PATENT DOCUMENTS

| | | | |
|---|---|---|---|
| 7,772,997 B2 * | 8/2010 | Frederick ............. | G06K 7/0008 341/50 |
| 10,425,215 B2 * | 9/2019 | Lee ........................ | H04B 7/063 |

(Continued)

OTHER PUBLICATIONS

M. Omer, R. Rimini, P. Heidmann, and J. S. Kenney, "A Compensation Scheme to Allow Full Duplex Operation in the Presence of Highly Nonlinear Microwave Components for 4 G systems", IEEE MTT-S International Microwave Symposium, 2011.

(Continued)

*Primary Examiner* — Jean B Corrielus
(74) *Attorney, Agent, or Firm* — Lowenstein Sandler LLP (57) ABSTRACT

Technologies directed to digital active interference cancellation (d-AIC) for full duplex transmit-receive (TX-RX) concurrency. An integrated circuit can include first and second analog front-ends (AFE) and digital front-end (DFE) circuits and a digital AIC circuit that generates a scaled and delayed replica of a first quadrature (IQ) sample corresponding to first data transmitted by the first AFE circuit which is being coupled into the receiver as aggressor. The digital AIC circuit receives a second IQ sample from the second AFE circuit, the second IQ sample corresponding to second data being received by the second AFE circuit. The digital AIC circuit subtracts the scaled and delayed replica of the first IQ sample from the second IQ sample to obtain a third IQ sample and sends the third IQ sample to the second DFE circuit. Third IQ sample is the desired signal when d-AIC cancels the self-interference.

20 Claims, 7 Drawing Sheets

(51) Int. Cl.
*H04L 5/14* (2006.01)
*H04B 1/04* (2006.01)
*H04B 1/16* (2006.01)
*H04B 1/525* (2015.01)
*H04B 1/715* (2011.01)
*H04B 15/00* (2006.01)
*H04B 1/7097* (2011.01)
*H04B 1/719* (2011.01)
*H04B 1/7107* (2011.01)
*H04J 11/00* (2006.01)
*H04W 4/80* (2018.01)
*H04W 84/12* (2009.01)
*H04B 1/62* (2006.01)
*H04B 1/12* (2006.01)

(52) U.S. Cl.
CPC .......... *H04J 11/004* (2013.01); *H04L 5/1461* (2013.01); *H04B 1/126* (2013.01); *H04B 1/62* (2013.01); *H04W 4/80* (2018.02); *H04W 84/12* (2013.01)

(56) References Cited

U.S. PATENT DOCUMENTS

| | | | | |
|---|---|---|---|---|
| 10,666,305 | B2* | 5/2020 | Choi | H04B 1/18 |
| 2013/0052964 | A1* | 2/2013 | Husted | H04B 17/11 |
| | | | | 455/73 |
| 2013/0286903 | A1* | 10/2013 | Khojastepour | H04B 1/123 |
| | | | | 370/280 |
| 2016/0285486 | A1* | 9/2016 | Qin | H04B 17/345 |
| 2016/0329982 | A1* | 11/2016 | Lim | H04B 1/525 |
| 2017/0041124 | A1* | 2/2017 | Khandani | H04B 1/50 |
| 2018/0006795 | A1* | 1/2018 | Raaf | H04B 1/44 |
| 2019/0158193 | A1* | 5/2019 | Jain | H04B 15/02 |

OTHER PUBLICATIONS

Hwang, B. Song, C. Nguyen, S. Soliman, "Digitally Controlled Analog Wideband Interference Cancellation for In-Device Spectrum Sharing and Aggregation", IEEE Journal on Selected areas in Communications (JSAC), vol. 34, No. 11, Nov. 2016.

* cited by examiner

DIGITAL ACTIVE INTERFERENCE CANCELLATION FOR FULL DUPLEX TRANSMIT-RECEIVE (TX-RX) CONCURRENCY

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Technologies directed to digital AIC for full duplex transmit-receive (TX-RX) concurrency. If a radio is transmitting while another radio on a same integrated circuit (commonly referred to as a combo radio chip) is trying to receive a packet, the transmitting radio can be an aggressor to the receiving radio if the isolation in between the two radios is low. Conventional solutions use Time Division Duplex (TDD) based medium access control (MAC), which does not allow concurrent operation of multiple radios, such as a Wi-Fi® radio and a Bluetooth® radio. Using TDD based MAC increases the latency and reduces throughput at the receivers since medium is accessible only part of the time. Some solutions have included analog circuitry for AIC. The analog circuitry is relatively more expensive to implement and occupies more area on the integrated circuit or includes components that are external to the integrated circuit.

Aspects of the present disclosure address the above and other deficiencies by using digital AIC that allows concurrent operation of multiple radios in a same integrated circuit. The proposed digital AIC scheme is implemented in a digital inphase-quadrature (IQ) domain of a receiver (Rx) radio, after an analog-to-digital conversion (ADC). An electronic device with two radio connectivity solutions, such as the Wi-Fi® and Bluetooth® (BT classic and Bluetooth® Low Energy (BLE)) solutions, on a single combo chip can implement this technology. This is possible because the single combo chip hosting the transmission and reception of multiple radios already knows the interfering signal, a scaled and delayed digital replica of which can be used for digitally-controlled AIC. To do so, the single combo chip should be configured to share the digital IQ samples in between the radios to implement the digital AIC block (also referred to herein as d-AIC or digital AIC circuit). The performance of the digital AIC described herein allow concurrent operation of a Wi-Fi® radio and one or more Bluetooth® radios with performance close to that of a standalone radio. Aspects of the present disclosure enable TX-RX concurrency and offer a digital solution which enables mechanisms for system optimization without increasing the complexity significantly. Aspects of the present disclosure eliminate the need for TDD based MAC, hence improving latency and throughput at the receiver. Given the AIC is digital, the proposed digital implementations are expected to occupy less area and reduce cost when compared to analog implementations.

Figure 1:
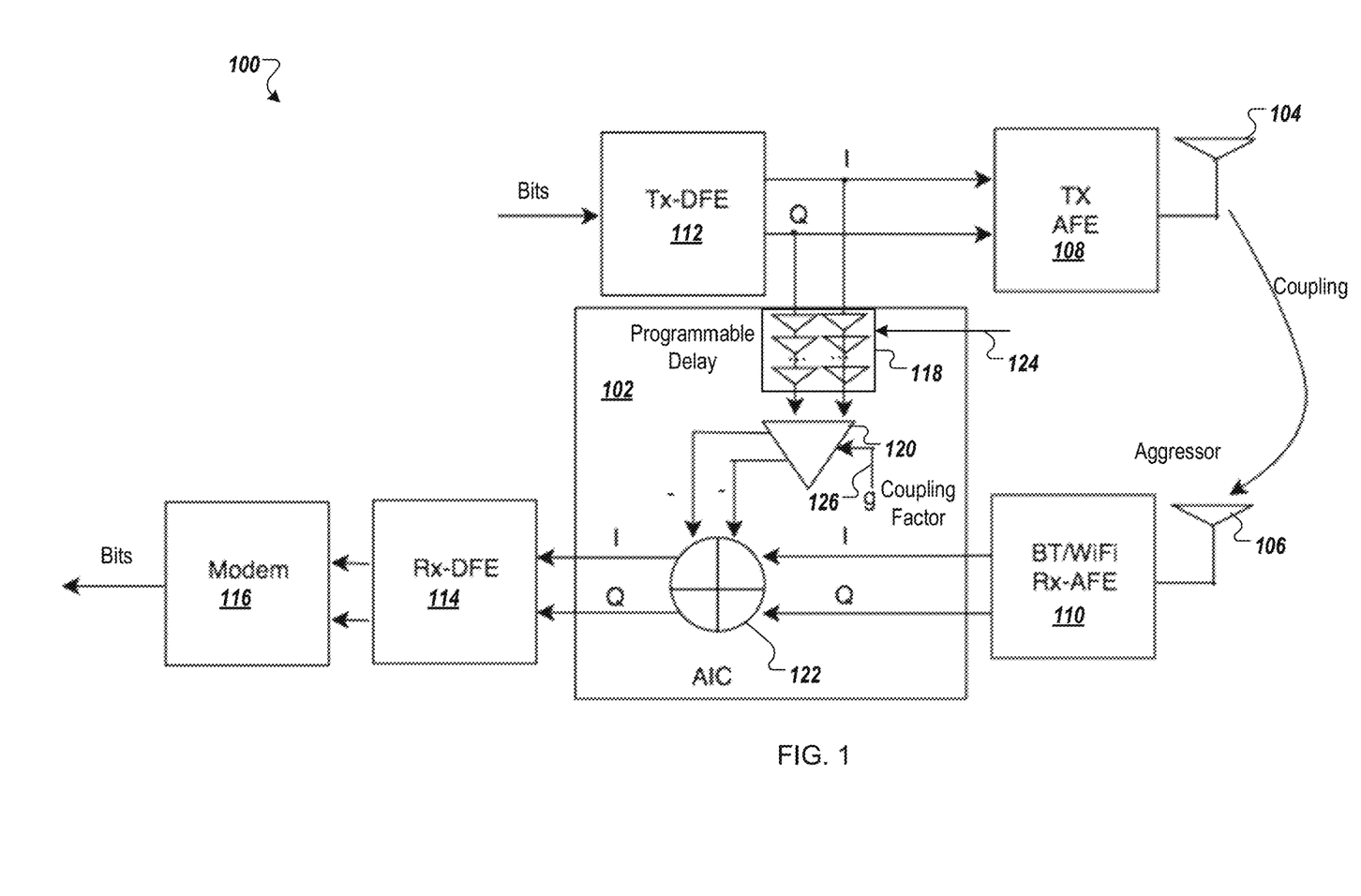
FIG. 1 is a block diagram of a System on Chip (SoC) with a digital active interference cancellation (AIC) circuit for full duplex transmit-receive (TX-RX) concurrency according to one embodiment.

FIG. 1 is a block diagram of a System on Chip (SoC) 100 with a digital active interference cancellation (d-AIC) circuit 102 for full duplex transmit-receive (TX-RX) concurrency according to one embodiment. The SoC 100 can be part of any electronic device and can be coupled to one or more antennas, such as a first antenna 104 and a second antenna 106. The SoC 100 is a single integrated circuit with multiple components/radios, illustrated as separate blocks, including a first analog front-end (AFE) circuit 108 of a first radio, a second AFE circuit 110 of a second radio, a first digital front-end (DFE) circuit 112 of the first radio, and a second DFE circuit 114 of the second radio. The first AFE circuit 108 is coupled to the first antenna 104. The second AFE circuit 110 is coupled to the second antenna 106. The d-AIC circuit 102 is coupled to the first AFE circuit 108, the second AFE circuit 110, the first DFE circuit 112, and the second DFE circuit 114. The d-AIC circuit 102 receives first IQ samples from the first Tx-DFE circuit 112 and receives second IQ samples from the second Rx-AFE circuit 110. The IQ samples, which are also referred to as quadrature signals, IQ data, or IQ signals, are used in RF applications for RF signal modulation and demodulation. In general, a pair of periodic signals are said to be in "quadrature" when they differ in phase by 90 degrees. That is, the "in-phase" signal or reference signal is referred to as "I," and the signal that is shifted by 90 degrees (the signal in quadrature) is called "Q." The IQ sample can include the amplitude of the in-phase signal (i.e., I value) and the amplitude of the quadrature signal (i.e., Q value). The first IQ samples are representative of first data being transmitted by the first AFE circuit 108. The second IQ samples are representative of second data being received by the second AFE circuit 110 concurrently with the first data being transmitted by the first AFE circuit 108. The digital AIC circuit 102 generates third IQ samples by scaling and delaying the first IQ samples and subtracts the third IQ samples from the second IQ samples that result in fourth IQ samples. That is, the third IQ samples are scaled and delayed digital replicas of the first IQ samples and the fourth IQ samples represent the difference between the second IQ samples and the third IQ samples. The digital AIC circuit 102 sends the fourth IQ samples to the second DFE circuit 114. The fourth IQ samples are representative of the second data being received with interference from the first IQ samples which is being cancelled by the d-AIC. Although illustrated as separate blocks in FIG. 1, the functionality described herein can be implemented in various manners.

In a further embodiment, the SoC 100 includes a modem 116 coupled to the second DFE circuit 114. The modem 116 converts the second data into bits for further processing by the SoC 100 or a host processor coupled to the SoC 100. In another embodiment, the SoC 100 includes a first modem coupled to the first DFE circuit 112 and a second modem coupled to the second DFE circuit 114. The first modem can be a wireless local area network (WLAN) modem and the second modem can be a personal area network (PAN) modem.

In the depicted embodiment, the digital AIC circuit 102 includes a delay circuit 118, a programmable gain circuit 120, and a mathematical operation circuit 122 (e.g., adder, subtraction circuit, optimization algorithm, or other mathematical function). The mathematical operation circuit can also apply additional adaptive filtering to minimize the estimation error. The delay circuit 118 can be a programmable delay circuit, a fractional delay circuit, or other circuits that can delay a signal. The delay circuit 118 is configured to delay the first IQ sample according to a first control signal 124. The programmable gain circuit 120 is configured to scale the first IQ sample according to a second control signal 126. The second control signal 126 can correspond to a coupling/scaling factor in between the first AFE 108 input and the second AFE 110 output. This coupling happens through the Tx antenna 104 coupled to the second Rx antenna 106 due to poor isolation. The coupling factor and programmable delay can be characterized/calibrated during manufacturing and stored in memory before deployment and they can be fine-tuned during operation and stored in a register, for example. The adder circuit 122 is configured to receive the scaled, delayed and negated replica of the first IQ sample and the second IQ sample from the second AFE circuit 110. It subtracts the scaled and delayed replica of the first IQ sample from the second IQ sample to obtain the third IQ sample. The first control signal 124 and the second control signal 126 can be received from a separate controller, stored in configuration registers, or the like. Like the second control signal 126, the first control signal 124 can be calibrated to ensure that the correct digital IQ samples are being subtracted by the adder circuit 122. This way, the propagation delay within the interference coupling path is accounted for.

The embodiments described herein can be used in the following example use cases for TX-RX full concurrency as set forth in Table 1.

TABLE 1

Tx//Rx concurrency use cases

| Scenario | Tx/Rx | Concurrency Use Cases |
|---|---|---|
| 1 | BLE Tx/BT Rx | smart home control commands over BLE and audio streaming to a hearable device with BT-A2DP (Advanced Audio Distribution Profile) |
| 2 | Wi-Fi ® Tx/BT Rx | Voice over IP (VoIP) call over Wi-Fi ® via the cloud while simultaneously controlling |
| 3 | BT Tx/Wi-Fi ® Rx | smart home gadgets over BT |
| 4 | Wi-Fi ® Tx/BT Rx | Whole home audio distribution over Wi-Fi ® while receiving A2DP packets over BT from the phone |

Figure 2:
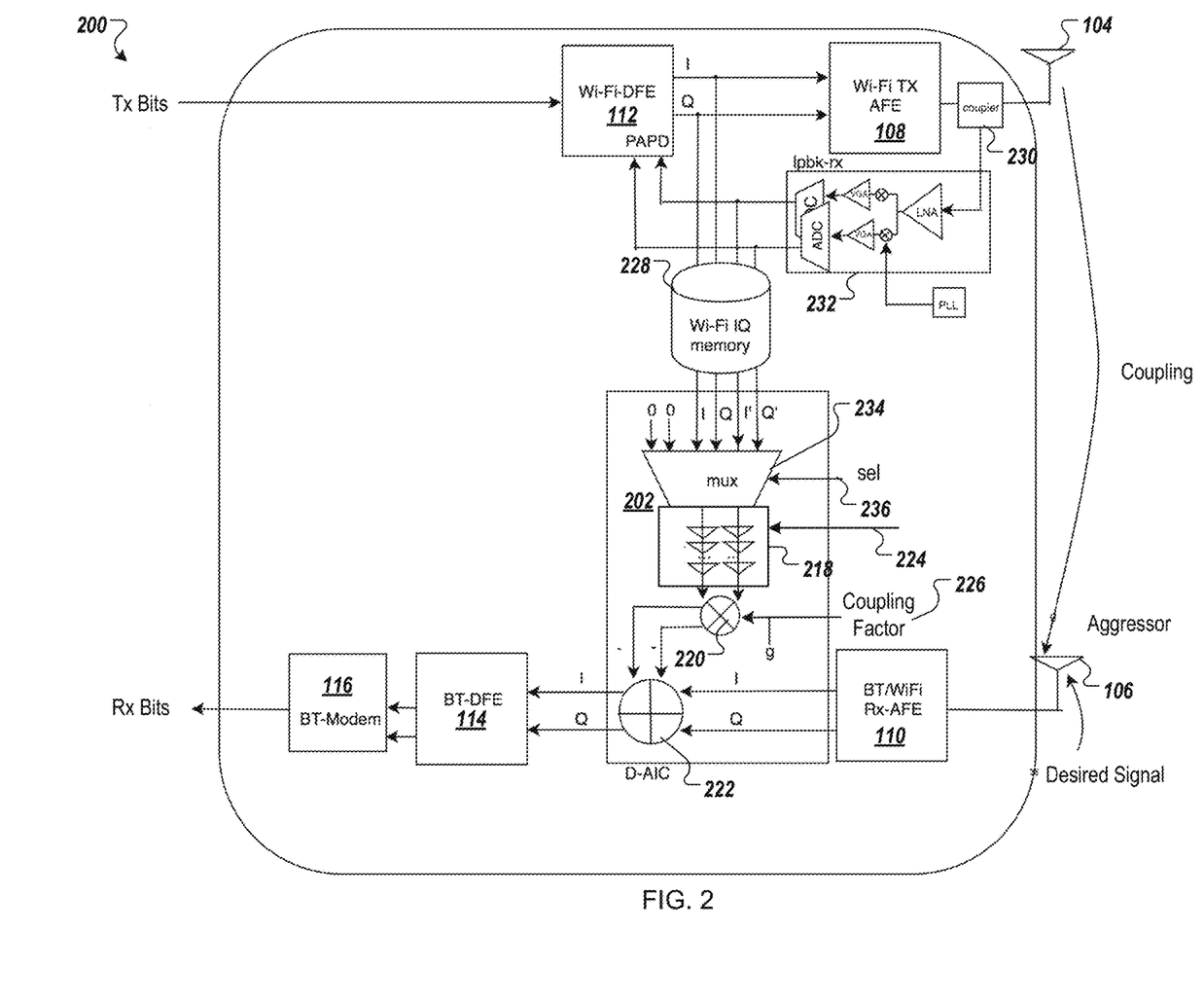
FIG. 2 is a block diagram of a SoC with a digital AIC circuit for full duplex transmit-receive (TX-RX) concurrency according to another embodiment.

FIG. 2 is a block diagram of a SoC 200 with a d-AIC circuit 202 for full duplex transmit-receive (TX-RX) concurrency according to another embodiment. The SoC 200 can be part of any electronic device and can be undesirably coupled to one or more antennas, such as the first antenna 104 and the second antenna 106. The SoC 200 is a single integrated circuit with multiple components and transceivers. The SoC 200 and d-AIC circuit 202 are similar to the SoC 100 and d-AIC circuit 102 as noted by similar reference numbers, except where expressly noted. The SoC 200 includes a first memory 228, a coupler 230, and a loopback receiver 232. The first memory 228 can be memory reserved in the SoC 200 for storing IQ samples, such as WLAN IQ samples from the WLAN radio including the first DFE circuit 112 and AFE circuit 108. The coupler 230 is coupled to an output of the first AFE circuit 108. The coupler 230 replicates an output signal from the first AFE circuit 108 being transmitted via the first antenna 104. The coupler 230 generates a copy of a TX signal and inputs this copy into the loopback receiver 232. The loopback receiver 232 is coupled to the coupler 230. The loopback receiver 232 receives the copy of the TX signal at the output of the first AFE circuit 108 and generates first IQ samples from the copy of the TX signal and stores the first IQ samples in the first memory 228. The loopback receiver 232 receives the TX signal as an analog signal from the coupler 230 and outputs the digital IQ samples to be used as the estimate of the interfering signal. In one embodiment, the loopback receiver 232 includes a low-noise amplifier (LNA), baseband Variable gain amplifiers (VGAs) for amplifying the analog I and Q signals, and ADC circuits for digitizing the in-phase signal (I) and the quadrature signal (Q). The VGA inputs can be connected to individual mixers for down-conversion of the analog IQ signals that are each mixed down with the carrier produced by a phase locked loop (PLL). The VGAs, ADCs, mixers, and PLL can be used to generate the digital IQ estimate of the analog TX signal appearing at the first antenna 104. These digital IQ samples can be fed back to the first DFE circuit 112 for a power amplifier pre-distortion (PAPD) algorithm as part of the first DFE circuit 112. The digital IQ samples can also be stored in the first memory 228 for the digital AIC circuit 202. In addition to storing the digital IQ samples from the loopback receiver 232, the first memory 228 can store the digital IQ samples directly from the output of the first DFE circuit 112.

In the depicted embodiment, the digital AIC circuit 202 includes a delay circuit 218, a programmable gain circuit 220, an adder circuit 222, and a selection circuit 234 (e.g., a multiplexer). The delay circuit 218 can be a programmable delay circuit, a fractional delay circuit, or the like. The selection circuit 234 can access the IQ samples from the loopback receiver 232 and the IQ samples from the output of the first DFE circuit 112. The selection circuit 234 can select one of these two sources of IQ samples according to a selection signal 236 and can output the selected IQ sample to the delay circuit 218. The delay circuit 218 is configured to delay the selected IQ sample according to a second control signal 224. The programmable gain (scaler) circuit 220 is configured to scale the selected IQ sample according to a third control signal 226 (e.g., coupling factor). The third control signal 226 can correspond to a coupling factor all the way in between the first AFE input towards antenna 104 coupled through the second antenna 106 to the second AFE output. The coupling factor can be characterized/calibrated during manufacturing and before deployment and the third control signal 226 can be fine-tuned during operation and be stored in a register, for example. The adder circuit 122 is configured to receive the scaled, delayed and negated replica of the first IQ sample and the second IQ sample from the second AFE circuit 110 and subtract the scaled and delayed replica of the first IQ sample from the second IQ sample to obtain the third IQ sample. Like the third control signal 226, the second control signal 224 can be calibrated to ensure that the correct digital IQ samples are being subtracted by the adder circuit 222. The selection signal 236 (i.e., first control signal for the multiplexer), the second control signal 224, and the third control signal 226 can be received from a separate controller, such as a Packet Traffic Arbitrator (PTA), received from configuration registers, or the like.

During operation in one implementation, the first memory 228 stores the first IQ samples from the loopback receiver 232 and fourth IQ samples from the first DFE circuit 112. The digital AIC circuit 202 uses the selection circuit 234 to retrieve either the IQ samples from the loopback receiver 232 or the IQ samples from the first DFE circuit 112. The digital AIC circuit 202 generates scaled, delayed and negated IQ samples by operating on the retrieved IQ samples from the multiplexer, subtracts the scaled and delayed IQ samples from the second IQ samples received from the second AFE circuit 110 to obtain filtered IQ samples, and sends the filtered IQ samples to the second DFE circuit 114. The filtered IQ samples represented a desired receive signal free from interference. The digital AIC circuit 202 allows the first AFE circuit 108 to transmit a TX signal while the second AFE circuit 110 receives an RX signal for concurrent TX-RX operation.

In some embodiments where the loopback receiver 232 is present for PAPD purposes on the aggressor TX radio, the ADC samples of the loopback receiver 232 can be used as inputs for the digital AIC circuit 202 to compensate for the second DFE circuit 114 of the victim radio. This can improve the performance of the digital AIC circuit 202 and can minimize the cancellation error, especially if the aggressor signal is a WLAN signal. WLAN chipsets can include a PAPD algorithm with a loopback receiver and this loopback receiver can be leveraged to achieve digital AIC when the WLAN signal (e.g., Wi-Fi® Tx) is the aggressor to the PAN receiver (e.g., BT Rx). The loopback receiver's ADC samples can be used to train a digital AIC algorithm used by the digital AIC circuit 202 at the victim radio.

A Typical Wi-Fi® waveform possesses a peak to average power ratio (PAPR) of about 10 to 11 dB and it depends on the number of subcarriers and the standard used. BT-Enhanced Data Rate (EDR) signals have about 3 dB PAPR due to the need for pulse shaping with Square Root Raised Cosine (SRRC) filter. The DFE circuits, such as the first DFE circuit 112 can implement a windowing algorithm as part of pulse shaping which affects the EDR PAPR as well. BT-Basic Rate (BR) and BT-BLE signals ideally exhibit 0-dB PAPR and might exhibit up to 1 dB PAPR if quantization noise in the implementation is considered. A high PAPR on the aggressor waveform requires the consideration of Tx-Nonlinearities during AIC. This minimizes the estimation error on the aggressor signal, hence optimizing the AIC performance. Table 2 summarizes these effects and scenarios.

TABLE 2

Metrics related to d-AIC complexity

| | | | Metrics related to AIC | |
| --- | --- | --- | --- | --- |
| Coexistence scenario | | | Is a loop back | |
| Radio in Tx (aggressor) | Radio in Rx (victim) | Tx signal PAPR | Rx typically implemented on chip? | D-AIC complexity |
| Wi-Fi® | BT | ~10 to 11 dB* | Yes | Low* |
| BT-EDR | Wi-Fi® or BT | ~3 dB** | Depends on the vendor** | Medium** |
| BT-BR | Wi-Fi® or BT | 0 to 1 dB*** | Not needed | Lowest |
| BT-BLE | Wi-Fi® or BT | 0 to 1 dB*** | Not needed | Lowest |
| Notes for each coexistence scenario | | *: due to Orthogonal frequency-division multiplexing (OFDM) and depends on number of subcarriers **: due to pulse shaping and windowing ***: due to quantization noise | *Low if Wi-Fi® Tx chain is already equipped with a loopback receiver for PAPD purposes. **The complexity is set to medium due to the need for a loopback Rx for the BT-EDR Tx radio which may not be available by the vendor | |

As can be seen in the table, when a BT-BR or a BT-BLE transmission is the aggressor, the digital AIC (d-AIC) complexity is the lowest due to low PAPR on the aggressor. Implementing the d-AIC for the receiver allows TX-RX concurrency of BT-BR and BT-BLE radios. The target performance can be similar to a standalone radio which does not suffer from self-interference caused by concurrent operation, such as illustrated in the simulation results of FIGS. 4-5. When the BT-EDR transmissions are present and are aggressor to the receiver (Rx) path, the loopback receiver 232 might help on estimating the non-linearity of the aggressor, improving the d-AIC performance. For cost saving purposes, the loopback receiver 232 might not readily be available for the BT-EDR radio, but can be supported in a combo chip to improve performance of the d-AIC as it will allow estimation of the nonlinearities that the aggressor BT-EDR waveform is going through. The d-AIC performance can be assessed in different coexistence scenarios. The d-AIC performance evaluation can be done with and without aid from the loopback receiver 232 on the aggressor radio. The most difficult coexistence scenario is to allow WLAN radio to transmit while allowing the PAN radio to receive a packet. This is mainly due to the fact that the WLAN transmissions do not typically use Tx power control to minimize interference to PAN reception and use high Tx power for e.g., 21 dBm/20 MHz which brings the spectral density to 8 dBm/MHz. Whereas a typical BT-BR Tx power is 13 dBm/MHz at the combo chip. Furthermore, Wi-Fi® signals exhibit large PAPR, making the aggressor difficult to deal with at the victim since aggressor passes through nonlinear distortion which needs to be estimated for proper cancellation. The easiest coexistence scheme to handle with d-AIC is the concurrent operation of BT-BR and BT-BLE since both of them have near 0 dB PAPR, making the d-AIC the simplest version. For each coexistence scenario the d-AIC needs to adapt for the propagation delay, coupling factor (CF) and the PAPR of the aggressor. The CF depends on the hardware implementation, antenna placement, and form factor of the device.

Figure 3:
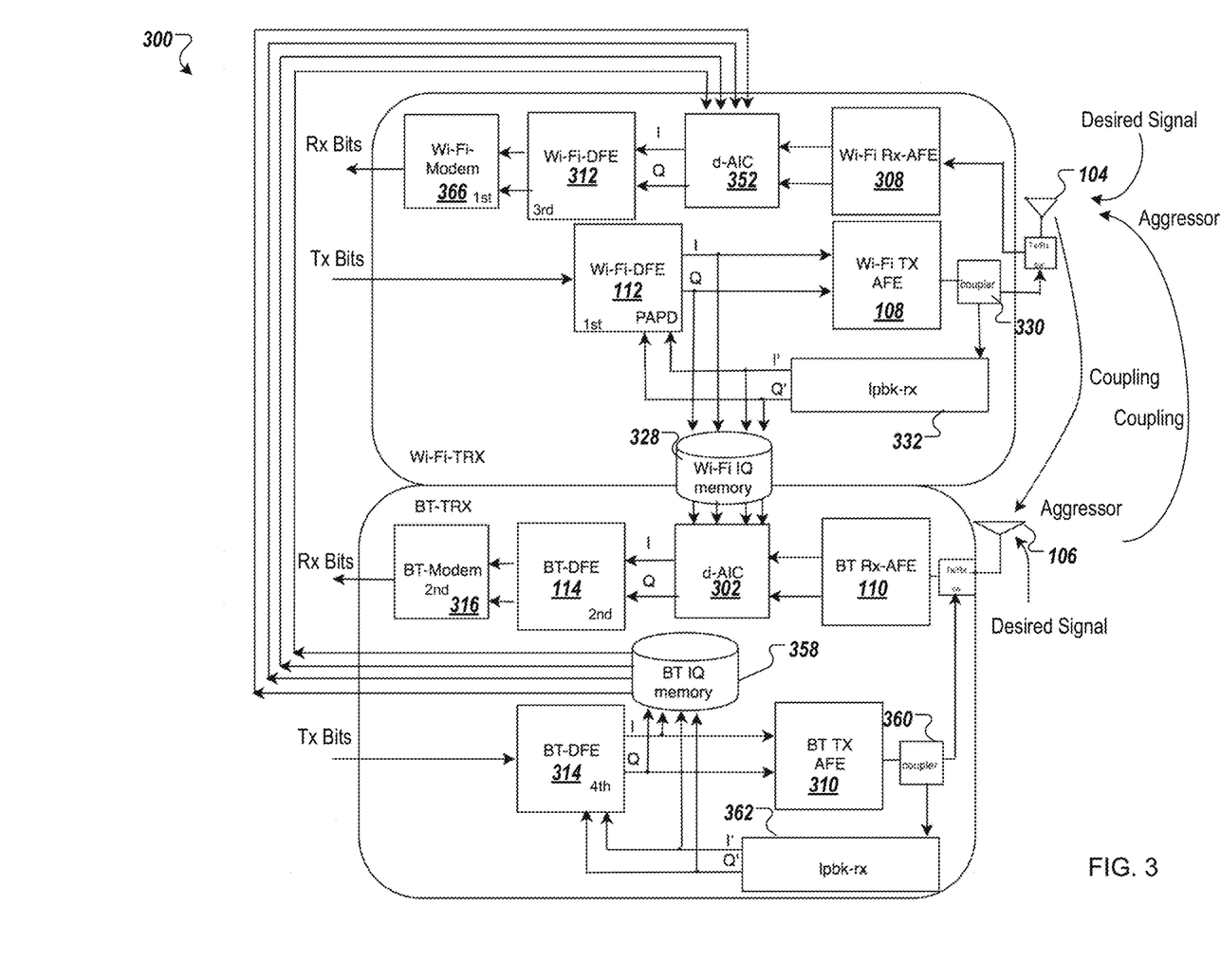
FIG. 3 is a block diagram of a SoC with two digital AIC circuits for full duplex transmit-receive (TX-RX) concurrency according to another embodiment.

FIG. 3 is a block diagram of a SoC 300 with two digital AIC circuits 302, 352 for full duplex transmit-receive (TX-RX) concurrency according to another embodiment. The SoC 300 can be part of any electronic device and can be coupled to one or more antennas, such as the first antenna 104 and the second antenna 106. The SoC 300 is a single integrated circuit with multiple components. The SoC 300 and digital AIC circuit 302 are similar to the SoC 100 and digital AIC circuit 102 as noted by similar reference numbers, except where expressly noted. In this embodiment, the SoC 300 can include two transceivers or two radios, each radio with one DFE circuit and one AFE circuit for transmitting and one DFE circuit and one AFE circuit for receiving. The SoC 300 includes the first AFE circuit 108, the second AFE circuit 110, the first DFE circuit 112, and the second DFE circuit 114, as described above. The SoC 300 also includes a third AFE circuit 308, a fourth AFE circuit 310, a third DFE circuit 312, and a fourth DFE circuit 314. The SoC 300 includes a first memory 328, a first coupler 330, a first loopback receiver 332, a second memory 358, a second coupler 360, and a second loopback receiver 362. The first memory 328 can be memory reserved in the SoC 300 for storing IQ samples, such as WLAN IQ samples from the WLAN radio including the first AFE circuit 108 and the first DFE circuit 112. The second memory 358 can be memory reserved in the SoC 300 for storing IQ samples, such as PAN IQ samples from the PAN radio including the second AFE circuit 110 and the second DFE 114. The first coupler 330 is coupled to an output of the first AFE circuit 108. The first coupler 330 replicates an output signal from the first AFE circuit 108 being transmitted via the first antenna 104. The first coupler 330 generates a copy of a TX signal and inputs this copy into the first loopback receiver 332. The first loopback receiver 332 is coupled to the first coupler 330. The first loopback receiver 332 receives the copy of the TX signal at the output of the first AFE circuit 108 and generates first IQ samples from the copy of the TX signal and stores the first IQ samples in the first memory 328. The second coupler 360 is coupled to an output of the fourth AFE circuit 310. The second coupler 360 replicates an output signal from the fourth AFE circuit 310 being transmitted via the second antenna 106. The second coupler 360 generates a copy of a TX signal and inputs this copy into the second loopback receiver 362. The second loopback receiver 362 is coupled to the second coupler 360. The second loopback receiver 362 receives the copy of the TX signal at the output of the fourth AFE circuit 310 and generates IQ samples from the copy of the TX signal and stores the IQ samples in the second memory 358.

During operation, the digital AIC circuit 302 receives a first IQ sample corresponding to first data transmitted by the first AFE circuit 108 of a first transceiver (e.g., Wi-Fi®-TRX) and generates a scaled and delayed replica of the first IQ sample. The first IQ sample can be from the first loopback receiver 332 or the first DFE circuit 112, as described herein. The digital AIC circuit 302 receives a second IQ sample from the second AFE circuit 110 of a second transceiver (e.g., BT-TRX). The second IQ sample corresponds to second data being received by the second AFE circuit 110. The digital AIC circuit 302 subtracts the scaled and delayed replica of the first IQ sample from the second IQ sample to obtain a third IQ sample and sends the third IQ sample to the second DFE circuit 114 of the first transceiver. In one embodiment, the first IQ sample is stored in the first memory 328 or selected from two different IQ samples stored in the first memory 328. The digital AIC circuit 302 allows concurrent TX-RX operation by the first transceiver transmitting and the second transceiver receiving. Alternatively, the digital AIC circuit 302 or a separate digital AIC circuit 352 can allow concurrent TX-RX operation by the second transceiver transmitting and the first transceiver receiving as described below.

During operation, the digital AIC circuit 302 (or 352 as illustrated in FIG. 3) stores a fifth IQ sample in the second memory 358. The fifth IQ sample can be output from an output of the fourth DFE circuit 314 of the second transceiver. For example, the second loopback receiver 362 receives a copy of a second TX signal at the output of the fourth AFE circuit 310 of the second transceiver, generates a sixth IQ sample from the copy of the second TX signal, and stores the sixth IQ sample in the second memory. The digital AIC circuit 302 (or 352) can retrieve or select the fifth IQ sample or the sixth IQ sample based on a selection signal, as described herein. The digital AIC circuit 302 (or 352) can scale and delay the replica of the selected IQ sample and subtract the scaled and delayed replica from an IQ sample from the third AFE circuit 308 and send the resulting IQ sample to the third DFE circuit 312.

In a further embodiment, the SoC 300 includes a first modem coupled to the third DFE circuit 312 and a second modem 316 coupled to the second DFE circuit 114. The first modem 366 receives a seventh IQ sample from the third DFE circuit 312 and converts the seventh IQ sample into a first digital value (e.g., Rx bits). The second modem 316 receives the third IQ sample from the second DFE circuit 114 and converts the third IQ sample into a second digital value (e.g., Rx bits).

It should be noted that FIG. 3 illustrates the digital AIC circuit as two separate components. In other embodiments, the functionality of the two digital AIC circuits can be implemented in the same digital AIC circuit. Also, although the DFE and AFE circuits are illustrated as being part of two transceivers, the digital AIC circuit(s) can be implemented in various configurations of the AFE and DFE circuits, regardless as being part of a receiver, a transmitter, a transceiver, or the like.

More details on the proposed d-AIC scheme are described below with respect to a couple of examples. Streaming media devices might require concurrent operation of BT classic with BT-BLE or concurrent operation of Wi-Fi® with BT. The embodiments of the digital AIC described herein enable concurrent TX-RX operation as long as the receiver Automatic Gain Control (Rx-AGC) on the external-Front end Module (e-FEM), as well as on chip, can handle large interferers and avoid saturation of the Low Noise Amplifier (LNA) at the victim radio. When the interference power is detected to be large, an Rx-AGC circuit with an attenuator can be implemented before the LNA input and adjust the attenuation level until the saturation problem is diminished as detected by a peak detector followed by a low pass filter (LPF) and a comparator, such as illustrated and described with respect to FIG. 4.

Figure 4:
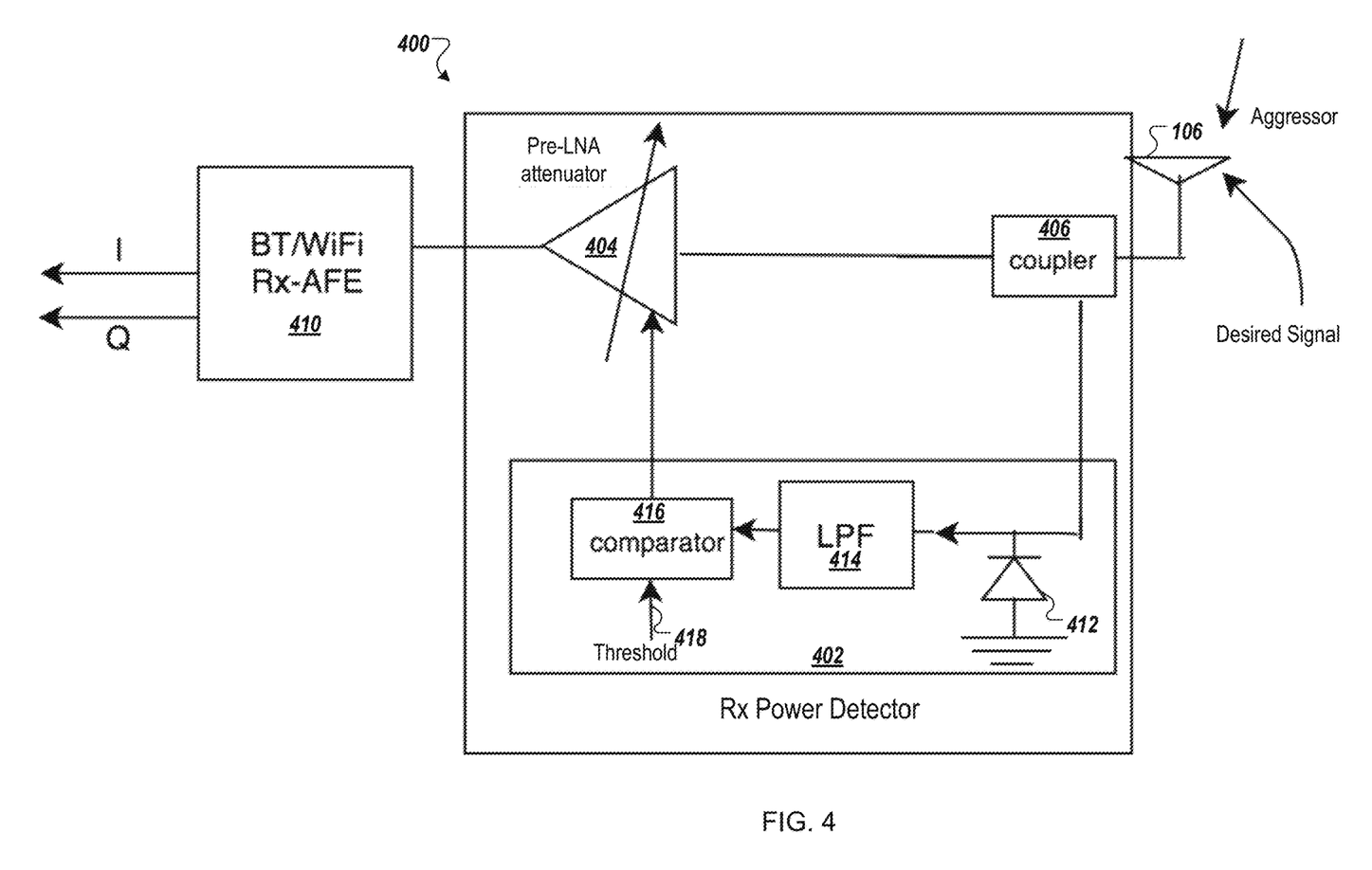
FIG. 4 is a block diagram of a receiver Automatic Gain Control (Rx-AGC) circuit with a power detector and a programmable attenuator for avoiding saturation at a victim low-noise amplifier (LNA) while allowing full duplex TX-RX concurrency according to one embodiment.

FIG. 4 is a block diagram of a receiver Automatic Gain Control (Rx-AGC) circuit 400 with a power detector 402 and a programmable attenuator 404 for avoiding saturation at a victim low-noise amplifier (LNA) while allowing full duplex TX-RX concurrency according to one embodiment.

A coupler 406 is coupled to the second antenna 106 that receives a RX signal. The coupler 406 generates a copy of the RX signal for the power detector 402. The power detector 404 controls the attenuator 404 that also receives a copy of the RX signal. The attenuator 404 is a pre-LNA attenuator before an LNA of a LNA of an AFE circuit 410. The AFE circuit 410 can be part of a receiver or a transceiver. The AFE circuit 410 can be similar to the second AFE circuit 110 of FIGS. 1-3. The AFE circuit 410 includes an LNA at the input and an ADC at the output. That is the AFE circuit 410 outputs ADC samples as I and Q samples.

In the depicted embodiment, the power detector 402 includes a diode 412 and a low pass filter (LPF) 414 coupled to the coupler 406. A comparator 416 is coupled to an output of the LPF 414. The comparator 416 compares an output of the LPF 414 with a threshold 418. When the output of the LPF 414 exceeds the threshold 418, the comparator activates the attenuator 404 to attenuate the RX signal. The attenuated RX signal can prevent the LNA in the AFE circuit 410 from saturating in certain conditions.

In a TX-RX coexistence scenario, the isolation between the aggressor (Tx) and the victim (Rx) can be poor. For example, for small form factors such as dongle device, the worst-case isolation could be 7 dB, whereas another device such as a voice-controlled speaker device is about 10 dB. The Rx-AGC circuit 400 does not degrade existing performance, except for some loss from the coupler 406 in the Rx path (e.g., a dB of path loss). The Rx-AGC circuit 400 can reduce or eliminate the saturation conditions that can existing when one radio is transmitting while the other radio is receiving. In contrast, without this technology, allowing TX-RX mode of operation may degrade the receiver performance especially if the analog distortions are creating wideband interference due to reciprocal mixing at the victim and intermodulation distortion (IMD) at the aggressor.

The embodiments described herein of digital AIC can cancel the self-interference coupling from the coexisting radios that are on the same board, where accessing the IQ samples of the aggressor is possible. If such an interference is not cancelled, then throughput and latency requirements may not be met at the receiver. Analog version of AIC necessitates the addition of a coupler to both the Tx path (aggressor) and to the Rx path (victim), which introduces a path loss and results in Key Performance Indicator (KPI) hit on the Tx power and Rx sensitivity. Furthermore, in analog implementations, the propagation delay is adjusted with analog components which may cause the delay adjustment to be vulnerable to process, voltage, temperature, and frequency (PVTF) variations. This in turn can degrade performance of the AIC mechanism. Furthermore, analog implementations are costly in area and cost of materials. In contrast, the digital AIC embodiments described herein are more resilient to aforementioned PVTF variations, and yet does not degrade existing sensitivity while offering flexibility and full programmability.

The digital AIC circuit can be implemented as a digitally-controlled AIC scheme in a processing device. A Tx-AFE stands for AFE for a transmitter or a transceiver and typically includes a digital-to-analog converter (DAC) at the input, whereas Tx-DFE block (transmitter DFE in the Tx path) includes all the Digital Signal Processing (DSP) blocks to produce IQ samples from the information bits. Similarly, the DFE block in the Rx path includes all the DSP blocks to produce IQ samples at the symbol rate from the IQ samples at the AFE output. As described herein, the victim can either be a Wi-Fi® radio or a BT radio and the aggressor can either be a Wi-Fi® radio or a BT radio. When the aggressor is a Wi-Fi® signal, the sample rate used by the digital AIC block (d-AIC) at the BT-Rx-DFE (Bluetooth® receiver DFE) should be large enough to be able to cancel all the wideband distortions caused by the Wi-Fi® signal which is typically of 20 MHz bandwidth. When Inter Modulation Distortion (IMD) and reciprocal mixing effects are considered for the aggressor, sampling rates in the order of 300-400 MHz might be sufficient at the d-AIC block of the receiver (or other transceiver). The d-AIC block can be added in the receiver chain after ADC. Its sampling rate can be adjusted depending on the signal attributes (signal bandwidth) and the channel frequency of the aggressor signal relative to the desired Rx signal. When the channel separation in between the aggressor and the victim are higher than a threshold, the d-AIC can even be turned off, or sampling rate can be reduced to save power. This can be controlled by information form a central controller such as a PTA, which has access to channel frequency information of the aggressor. When the channel separation is less than a certain threshold (for e.g. on the 2.4 GHz band), the d-AIC needs to be turned on and the sampling rate shall be chosen appropriately. If the aggressor is from a BT transmission, the d-AIC is pretty simple, especially for BLE or BT-Basic Rate (BR) transmissions that do not get affected by analog nonlinearities due to constant envelope modulation with Gaussian frequency shift keying (GFSK). However, the effects of reciprocal mixing shall carefully be analyzed based on worst case Tx power, channel separation, and phase noise specifications.

In one embodiment, the coupling factor can be determined and be used for scaling and cancelling the digital copy of the interferer at the receiving radio, depending on the antenna isolation. The calibration can be done at room temperature and can be stored in registers which can then be used in runtime operation. This does not necessarily capture any Process, Temperature, and Frequency channel variations. Capturing those variations can add into the complexity. However, calibration at one channel and at one temperature may provide good enough performance gains. Propagation delay various over PVTF under different coexisting scenarios can be calibrated and programmed as well. Also, as described herein the d-AIC scheme can be used in the presence of a large PAPR aggressor waveform (e.g., Wi-Fi® signal) by using the IQ samples from the loopback receiver of the aggressor radio, instead of from the baseband Tx-DFE. By using the IQ samples directly from the loopback receiver, the estimation error can be minimized as the nonlinearities introduced by the Tx-AFE (transmitter AFE) of the aggressor can be estimated.

Figure 5:
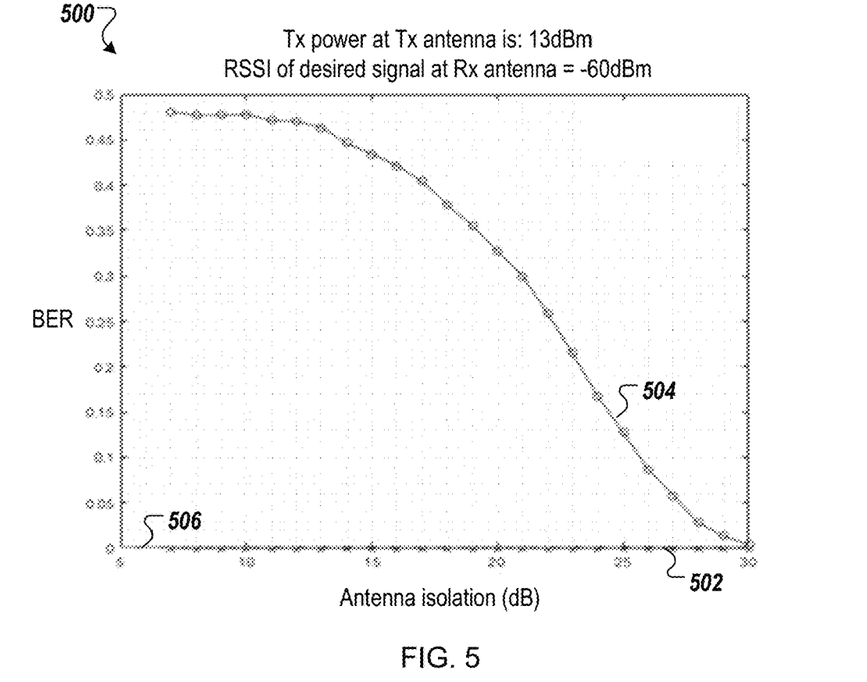
FIG. 5 is a graph of a bit error rate (BER) performance at a victim radio with and without digital AIC according to one embodiment.

FIG. 5 is a graph 500 of a bit error rate (BER) performance at a victim radio with and without digital AIC according to one embodiment. The graph 500 shows a BER performance 502 at the victim radio with digital AIC and BER performance 504 at the victim radio without digital AIC. The graph 500 also shows a BER threshold 506 (e.g., 0.1%). As shown in the graph 500, between 5 dB and 30 dB antenna isolation, the BER performance 502 is lower than the BER performance 504, showing performance gains with digital AIC. The SoC can contain two BT transceivers which can be turned on at the same time. It is assumed that one of the BT transceivers is trying to receive a BT-BLE signal while the other one is transmitting a BT-BLE signal which is coupling back into the receiver as a built-in interference due to imperfect isolation. The receiver's BER performance is presented versus CF from 7 dB to 30 dB in one dB steps. Noise figure (NF) at the receiver is assumed to be 6 dB above thermal noise, where signal bandwidth is 1 MHz. The Receiver's Minimum Detectable signal (MDS) level is measured to be −101.6 dBm for a BER of 0.001 with 6 dB Noise Figure. This translates into a Signal to Noise Ratio (SNR) of 6.4 dB in 1 MHz bandwidth. The Received Signal Strength (RSS) of the desired signal at the Rx antenna is assumed to be −60 dBm (well above sensitivity level and thermal noise floor) which can be received without errors without the interference from the aggressor. The Tx power from the aggressor antenna is assumed to be 13 dBm with 100% duty cycle in transmission while the receiver is receiving. The CF and propagation delay from aggressor antenna to the victim antenna are assumed to be calibrated out. Any imperfections in such calibration can cause performance degradation which is not described herein.

Figure 6:
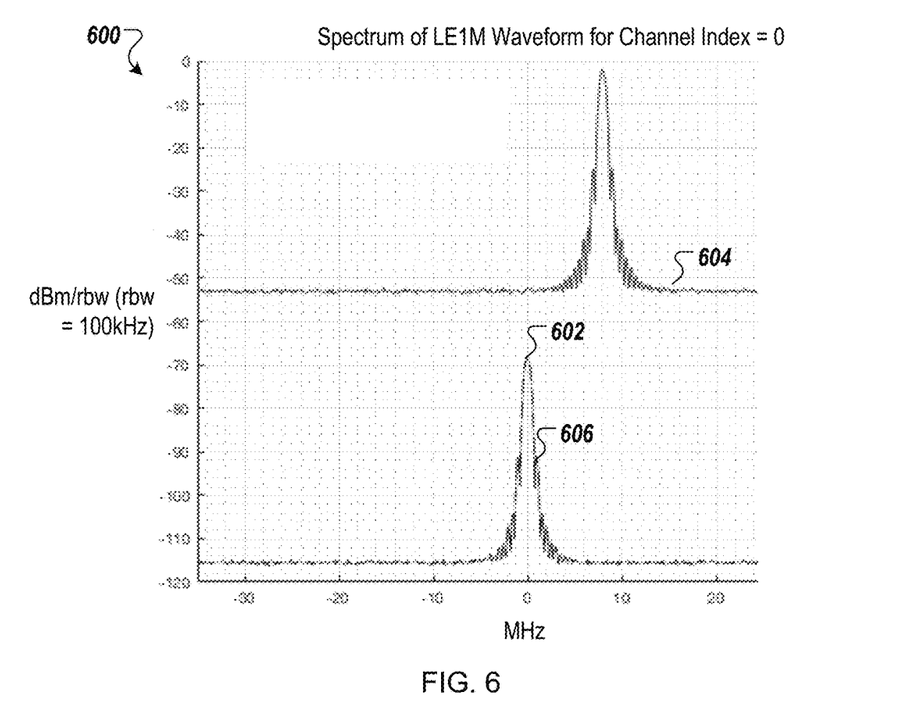
FIG. 6 is a graph of a power spectrum density at a victim radio with and without digital AIC according to one embodiment.

FIG. 6 is a graph 600 of a power spectrum density (PSD) at a victim radio with and without digital AIC according to one embodiment. The graph 600 shows a PSD 602 at the victim radio with digital AIC and PSD 604 at the victim radio without digital AIC. The graph 600 also shows PSD 606 for a standalone radio where there is no coexistence condition. The Power spectrum density is presented when a coupling factor is 7 dB. As a result, the desired signal at −60 dBm sees a large interferer at 13-7=−6 dBm which is +54 dBc. In this scenario, the BER at the receiver will be excessively large if d-AIC is not used when antenna isolation is poor. This is exhibited on the PSD estimation results as well which shows that the desired signal is buried under the noise from the aggressor, deeming reception impossible without d-AIC as SNR is poor. When the desired signal strength starts dropping near thermal noise levels and if the interference is too large for the ADC, then NF in the Rx chain will start degrading due to AGC back-offs. This affects MDS level. However, this phenomenon is not caused by d-AIC itself.

In some implementations, coupling factor calibration and digital delay adjustments can be done to program the digital AIC circuit. Fractional delay adjustments can improve resolution and save power as it eliminates the need to go to GHz sampling rates (ns resolution in delay elements). It can be assumed that the Rx chain is linear for AM-AM/AM-PM distortions due to the Rx-AGC, as described above with respect to FIG. 4.

Analog nonlinearities are negligible for BT-classic (1 Mbps) and BLE (1 Mbps and 2 Mbps) modulations and hence digital interference cancellation is the simplest to implement. However, if the aggressor is a Wi-Fi® signal, a loopback receiver on the aggressor can be used in order to linearize the interference and also to properly consider the interfering signal's characteristics as modelled in the IQ domain. Instead of using the digital baseband modulator output as an input to the AIC, the IQ samples at the output of the loopback receiver on the Wi-Fi® TX chain can be used.

Figure 7:
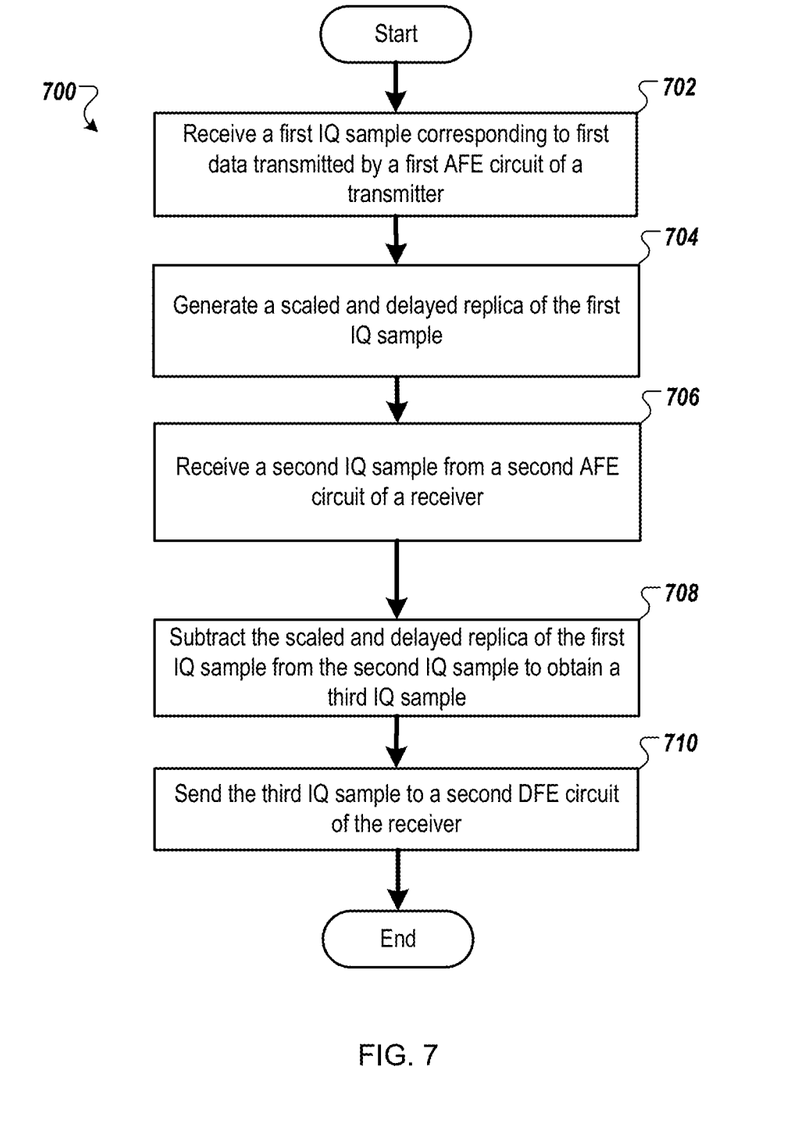
FIG. 7 is a flow diagram illustrating a method of digital AIC in IQ domain according to one embodiment.

FIG. 7 is a flow diagram illustrating a method 700 of digital AIC in IQ domain according to one embodiment. The method 700 may be performed by processing logic that comprises hardware (e.g., circuitry, dedicated logic, programmable logic, microcode, etc.), software, firmware, or a combination thereof. In one embodiment, the method 700 may be performed by any of the SoCs described herein and illustrated with respect to FIGS. 1-6.

Referring back to FIG. 7, the method 700 begins by the processing logic receives a first IQ sample corresponding to first data transmitted by a first AFE circuit of a transmitter (block 702). The processing logic generates a scaled and delayed replica of the first IQ sample (block 704). The processing logic receives a second IQ sample from a second AFE circuit of a receiver, the second IQ sample corresponding to second data being received by the second AFE circuit (block 706). The processing logic subtracts the scaled and delayed replica of the first IQ sample from the second IQ sample to obtain a third IQ sample (block 708). The processing logic sends the third IQ sample to a second DFE circuit of the receiver (block 710, and the method 700 ends.

In a further embodiment, the processing logic receives the first IQ sample by receiving the first IQ sample from a first DFE circuit of the receiver and storing the first IQ sample in a memory. In another embodiment, the processing logic receives the first IQ sample by receiving a copy of an transmit (TX) signal at the output of the first AFE circuit, generating the first IQ sample from the copy of the TX signal, and storing the first IQ sample in a memory.

In another embodiment, the processing logic stores the first IQ sample in a first memory, and also receives a copy of a first transmit (TX) signal at the output of the first AFE circuit, generates a fourth IQ sample from the copy of the first TX signal, and stores the fourth IQ sample in the first memory. In addition, the processing logic stores a fifth IQ sample in a second memory. The fifth IQ sample is output from an output of a fourth DFE circuit of a second transmitter. The processing logic receives a copy of a second TX signal at the output of a fourth AFE circuit of the second transmitter, generates a sixth IQ sample from the copy of the second TX signal, and stores the sixth IQ sample in the second memory.

In a further embodiment, the processing logic selects between the first IQ sample and the fourth IQ sample stored in the first memory as a first selected IQ sample. The processing logic generates the scaled and delayed replica of the first selected IQ sample. The processing logic selects between the fifth IQ sample and the sixth IQ sample stored in the second memory as a second selected IQ sample and generates a scaled and delayed replica of the second selected IQ sample.

In another embodiment, the processing logic receives a seventh IQ sample from a third DFE circuit of a second receiver and converts the seventh IQ sample into a first digital value. The processing logic can receive the third IQ sample from the second DFE circuit and convert the third IQ sample into a second digital value.

Figure 8:
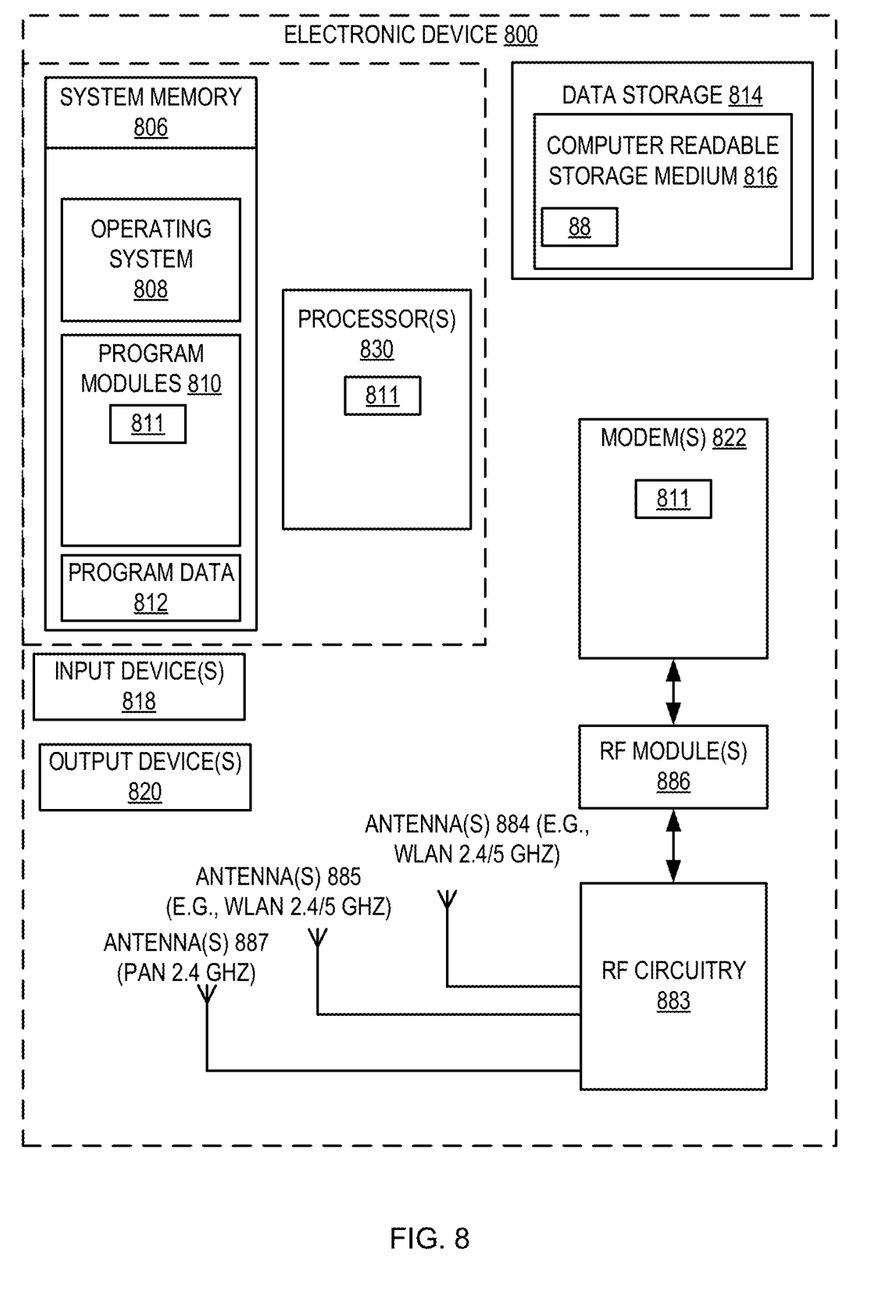
FIG. 8 is a block diagram of an electronic device for providing digital AIC in the IQ domain according to one embodiment.

FIG. 8 is a block diagram of an electronic device 800 for providing digital AIC in the IQ domain according to one embodiment. The electronic device 800 may correspond to the electronic devices described above with respect to FIGS. 1-7. Alternatively, the electronic device 800 may be other electronic devices, as described herein.

The electronic device 800 includes one or more processor(s) 830, such as one or more CPUs, microcontrollers, field programmable gate arrays, or other types of processors. The electronic device 800 also includes system memory 806, which may correspond to any combination of volatile and/or non-volatile storage mechanisms. The system memory 806 stores information that provides operating system component 808, various program modules 810, program data 812, and/or other components. In one embodiment, the system memory 806 stores instructions of methods to control operation of the electronic device 800. The electronic device 800 performs functions by using the processor(s) 830 to execute instructions provided by the system memory 806. In one embodiment, the program modules 810 may include a digital AIC 811. The digital AIC 811 may perform some of the operations of the digital AIC processes descried herein.

The electronic device 800 also includes a data storage device 814 that may be composed of one or more types of removable storage and/or one or more types of non-removable storage. The data storage device 814 includes a computer-readable storage medium 816 on which is stored one or more sets of instructions embodying any of the methodologies or functions described herein. Instructions for the program modules 810 (e.g., digital AIC 811) may reside, completely or at least partially, within the computer-readable storage medium 816, system memory 806 and/or within the processor(s) 830 during execution thereof by the electronic device 800, the system memory 806 and the processor(s) 830 also constituting computer-readable media. The electronic device 800 may also include one or more input devices 818 (keyboard, mouse device, specialized selection keys, etc.) and one or more output devices 820 (displays, printers, audio output mechanisms, etc.).

The electronic device 800 further includes a modem 822 to allow the electronic device 800 to communicate via a wireless connections (e.g., such as provided by the wireless communication system) with other computing devices, such as remote computers, an item providing system, and so forth. The modem 822 can be connected to one or more radio frequency (RF) modules 886. The RF modules 886 may be a WLAN module, a WAN module, PAN module, GPS module, or the like. The antenna structures (antenna(s) 884, 885, 887) are coupled to the RF circuitry 883, which is coupled to the modem 822. The RF circuitry 883 may include radio front-end circuitry, antenna switching circuitry, impedance matching circuitry, or the like. The antennas 884 may be GPS antennas, near-field communication (NFC) antennas, other WAN antennas, WLAN or PAN antennas, or the like. The modem 822 allows the electronic device 800 to handle both voice and non-voice communications (such as communications for text messages, multimedia messages, media downloads, web browsing, etc.) with a wireless communication system. The modem 822 may provide network connectivity using any type of mobile network technology including, for example, cellular digital packet data (CDPD), general packet radio service (GPRS), EDGE, universal mobile telecommunications system (UMTS), Single-Carrier Radio Transmission Technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 822 may generate signals and send these signals to antenna(s) 884 of a first type (e.g., WLAN 5 GHz), antenna(s) 885 of a second type (e.g., WLAN 2.4 GHz), and/or antenna(s) 887 of a third type (e.g., WAN), via RF circuitry 883, and RF module(s) 886 as descried herein. Antennas 884, 885, 887 may be configured to transmit in different frequency bands and/or using different wireless communication protocols. The antennas 884, 885, 887 may be directional, omnidirectional, or non-directional antennas. In addition to sending data, antennas 884, 885, 887 may also receive data, which is sent to appropriate RF modules connected to the antennas. One of the antennas 884, 885, 887 may be any combination of the antenna structures described herein.

In one embodiment, the electronic device 800 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 822 is shown to control transmission and reception via antenna (884, 885, 887), the electronic device 800 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
   a first antenna;
   a second antenna; and
   an integrated circuit comprising:
      a first analog front-end (AFE) circuit of a first radio, the first AFE circuit being coupled to the first antenna;
      a second AFE circuit of a second radio, the second AFE circuit being coupled to the second antenna;
      a first digital front-end (DFE) circuit of the first radio;
      a second DFE circuit of the second radio; and
      a digital active interference cancellation (AIC) circuit coupled to the first AFE circuit, the second AFE circuit, the first DFE circuit, and the second DFE circuit, wherein the digital AIC circuit:
         receives a first quadrature (IQ) sample from the first DFE circuit, the first IQ sample being representative of first data being transmitted by the first AFE circuit;
         receives a second IQ sample from the second AFE circuit, the second IQ sample being representative of second data being received by the second AFE circuit concurrently with the first data being transmitted by the first AFE circuit;
         generates a third IQ sample by scaling and delaying the first IQ samples;
         subtracts the third IQ sample from the second IQ sample that result in a fourth IQ sample, the fourth IQ sample being representative of the second data being received with interference from the first IQ sample being canceled by the digital AIC circuit; and
         sends the fourth IQ sample to the second DFE circuit.

2. The electronic device of claim 1, wherein the integrated circuit further comprises:
   a first modem coupled to the first DFE circuit, wherein the first modem is a wireless local area network (WLAN) modem; and
   a second modem coupled to the second DFE circuit, wherein the second modem is a personal area network (PAN) modem.

3. The electronic device of claim 1, wherein the integrated circuit further comprises:
   a first memory that stores the first IQ sample;
   a coupler coupled between the first AFE circuit and the first antenna; and
   a loopback receiver coupled to the coupler, the loopback receiver receives a copy of a transmit (TX) signal being transmitted by the first antenna, generates a fifth IQ sample from the copy of the TX signal, and stores the fifth IQ sample in the first memory, wherein the digital AIC circuit retrieves the fifth IQ sample, generates a sixth IQ sample by scaling and delaying the fifth IQ sample, subtracts the sixth IQ sample from the second IQ sample that result in a seventh IQ sample, and sends the seventh IQ sample to the second DFE circuit.

4. An integrated circuit comprising:
   a first analog front-end (AFE) circuit;
   a second AFE circuit;
   a first digital front-end (DFE) circuit;
   a second DFE circuit; and
   a digital active interference cancellation (AIC) circuit coupled to the first AFE circuit and the second DFE circuit, wherein the digital AIC is to:
      generate a scaled and delayed replica of a first quadrature (IQ) sample corresponding to first data transmitted by the first AFE circuit;
      receive a second IQ sample from the second AFE circuit, the second IQ sample corresponding to second data being received by the second AFE circuit;
      subtract the scaled and delayed replica of the first IQ sample from the second IQ sample to obtain a third IQ sample; and
      send the third IQ sample to the second DFE circuit.

5. The integrated circuit of claim 4, further comprising:
   a first memory;
   a coupler coupled to an output of the first AFE circuit; and
   a receiver coupled to the coupler, wherein the receiver is to:
      receive, from the first AFE circuit, a copy of a transmit (TX) signal;
      generate the first IQ sample from the copy of the TX signal; and
      store the first IQ sample in the first memory.

6. The integrated circuit of claim 4, wherein the digital AIC circuit comprises:
   a delay circuit to delay the first IQ sample according to a first control signal;
   a programmable gain circuit to scale the delayed first IQ sample according to a second control signal to produce the scaled and delayed replica of the first IQ sample; and
   a mathematical operation circuit coupled to the programmable gain circuit to receive the scaled and delayed replica of the first IQ sample and the second IQ sample from the second AFE circuit, wherein the mathematical operation circuit is to subtract the scaled and delayed replica of the first IQ sample from the second IQ sample to obtain the third IQ sample.

7. The integrated circuit of claim 4, further comprising:
   a first memory to store a fourth IQ sample received from an output of the first DFE circuit;
   a coupler coupled to an output of the first AFE circuit; and
   a receiver coupled to the coupler, wherein the receiver is to:
      receive a copy of a transmit (TX) signal from the first AFE circuit;

generate the first IQ sample from the copy of the TX signal; and store the first IQ sample in the first memory.

8. The integrated circuit of claim 7, wherein the digital AIC circuit comprises:
a first circuit coupled to the first memory, the first circuit to output a fifth IQ sample according to a first control signal, wherein the fifth IQ sample is the first IQ sample or the fourth IQ sample;
a delay circuit to delay the fifth IQ sample and output a sixth IQ sample according to a second control signal;
a programmable gain circuit to scale the sixth IQ sample and output a seventh IQ sample according to a third control signal; and
a second circuit coupled to the programmable gain circuit to receive the seventh IQ sample and the second IQ sample, wherein the second circuit is to subtract the seventh IQ sample from the second IQ sample to obtain the third IQ sample.

9. The integrated circuit of claim 4, further comprising:
a transmitter comprising the first AFE circuit and the first DFE circuit; and
a receiver comprising the second AFE circuit and the second DFE circuit.

10. The integrated circuit of claim 4, further comprising:
a first transceiver comprising a first transmitter with the first AFE circuit and the first DFE circuit, a first receiver with a third AFE circuit and a third DFE circuit, and a second digital AIC circuit; and
a second transceiver comprising a second receiver with the second AFE circuit and the second DFE circuit, a second transmitter with a fourth AFE circuit and a fourth DFE circuit, and the digital AIC circuit.

11. The integrated circuit of claim 10, wherein the first transceiver is a wireless local area network (WLAN) transceiver and the second transceiver is a personal area network (PAN) transceiver.

12. The integrated circuit of claim 10, further comprising:
a first coupler coupled to an output of the first AFE circuit;
the first receiver coupled to the first coupler, the first receiver receives a copy of a first transmit (TX) signal from the first AFE circuit and generates a fourth IQ sample;
a second coupler coupled to an output of the fourth AFE circuit; and
the second receiver coupled to the second coupler, the second receiver receives a copy of a second TX signal from the fourth AFE circuit and generate a fifth IQ sample.

13. The integrated circuit of claim 12, further comprising:
a first modem coupled to the third DFE circuit, wherein the first modem receives a sixth IQ sample from the third DFE circuit and converts the sixth IQ sample into a first digital value, wherein the sixth IQ sample corresponds to third data received by the first AFE circuit concurrently with fourth data transmitted by the second AFE circuit; and
a second modem coupled to the second DFE circuit, wherein the second modem receives the third IQ sample from the second DFE circuit and converts the third IQ sample into second digital value.

14. A method comprising:
receiving, by a digital active interference cancellation (AIC) circuit, a first quadrature (IQ) sample corresponding to first data transmitted by a first analog front-end (AFE) circuit of a transmitter;

generating, by the digital AIC circuit, a scaled and delayed replica of the first IQ sample;
receiving, by the digital AIC circuit, a second IQ sample from a second AFE circuit of a receiver, the second IQ sample corresponding to second data being received by the second AFE circuit;
subtracting, by the digital AIC circuit, the scaled and delayed replica of the first IQ sample from the second IQ sample to obtain a third IQ sample; and
sending, by the digital AIC circuit, the third IQ sample to a second digital front-end (DFE) circuit of the receiver.

15. The method of claim 14, wherein receiving the first IQ sample comprises:
receiving, by the digital AIC circuit from the first AFE circuit, a copy of a transmit (TX) signal;
generating, by digital AIC circuit, the first IQ sample from the copy of the TX signal; and
storing, by the digital AIC circuit, the first IQ sample in a memory.

16. The method of claim 14, further comprising:
storing, by the digital AIC circuit, the first IQ sample in a first memory;
receiving, by the digital AIC circuit from the first AFE circuit, a copy of a first transmit (TX) signal;
generating, by the digital AIC circuit, a fourth IQ sample from the copy of the first TX signal;
storing, by the digital AIC circuit, the fourth IQ sample in the first memory; and
selecting, by the digital AIC circuit, between the first IQ sample and the fourth IQ sample stored in the first memory as a fifth IQ sample, wherein generating the scaled and delayed replica of the first IQ sample comprises generating the scaled and delayed replica of the fifth IQ sample.

17. The method of claim 16, further comprising:
storing, by the digital AIC circuit, a sixth IQ sample in a second memory, wherein the sixth IQ sample is output from an output of a fourth DFE circuit of a second transmitter;
receiving, by the digital AIC circuit from a fourth AFE circuit of the second transmitter, a copy of a second TX signal;
generating, by the digital AIC circuit, a seventh IQ sample from the copy of the second TX signal;
storing, by the digital AIC circuit, the seventh IQ sample in the second memory; and
selecting, by the digital AIC circuit, between the sixth IQ sample and the seventh IQ sample stored in the second memory as an eighth IQ sample.

18. The method of claim 17, further comprising:
generating, by the digital AIC circuit, a scaled and delayed replica of the eighth IQ sample;
receiving, by the digital AIC circuit, a ninth IQ sample from a third AFE circuit of a second receiver, the ninth IQ sample corresponding to third data being received by the third AFE circuit;
subtracting, by the digital AIC circuit, the scaled and delayed replica of the eighth IQ sample from the ninth IQ sample to obtain a tenth IQ sample; and
sending, by the digital AIC circuit, the tenth IQ sample to a third DFE circuit of the second receiver.

19. The method of claim 18, further comprising:
receiving, by a first modem coupled to the third DFE circuit, the tenth IQ sample from the third DFE circuit of the second receiver;
converting, by the first modem, the tenth IQ sample into a first digital value;

receiving, by a second modem coupled to the second DFE circuit, the third IQ sample from the second DFE circuit; and converting, by the second modem, the third IQ sample into a second digital value.

20. The method of claim 14, wherein generating the scaled and delayed replica of the first IQ sample comprises:

receiving, by the digital AIC circuit, a first control signal and a second control signal;

delaying the first IQ sample to obtain a fourth IQ sample according to the first control signal; and scaling the fourth IQ sample to obtain a fifth IQ sample according to the second control signal, wherein the fifth IQ sample is the scaled and delayed replica of the first IQ sample.

* * * * *